US 8,534,197 B2

(12) United States Patent
Miller (10) Patent No.: US 8,534,197 B2
(45) Date of Patent: Sep. 17, 2013

(54) SUPERSONIC HYDROGEN TUBE VEHICLE

(75) Inventor: Arnold R. Miller, Golden, CO (US)

(73) Assignee: Supersonic Tubevehicle LLC, Golden, CO (US)

( * ) Notice: Subject to any disclaimer, the term of this patent is extended or adjusted under 35 U.S.C. 154(b) by 270 days.

(21) Appl. No.: 12/698,887

(22) Filed: Feb. 2, 2010

(65) Prior Publication Data

US 2010/0192799 A1     Aug. 5, 2010

Related U.S. Application Data

(60) Provisional application No. 61/202,152, filed on Feb. 2, 2009.

(51) Int. Cl.
*B61B 13/10*     (2006.01)
*B61C 7/00*     (2006.01)

(52) U.S. Cl.
USPC ............... 104/138.1; 104/281; 104/287

(58) Field of Classification Search
USPC ............. 104/138.1, 138.2, 23.2, 281, 287; 105/2, 3
See application file for complete search history.

(56) References Cited

U.S. PATENT DOCUMENTS

| | | | | |
|---|---|---|---|---|
| 3,100,454 | A * | 8/1963 | Dennis | 104/138.1 |
| 4,794,867 | A * | 1/1989 | Titz | 105/3 |
| 7,399,549 | B2 * | 7/2008 | O'Hara | 429/492 |
| 2007/0089636 | A1 * | 4/2007 | Guardo, Jr. | 104/281 |

FOREIGN PATENT DOCUMENTS

| | | |
|---|---|---|
| DE | 39 25 333 A1 | 2/1991 |
| DE | 3925333 * | 2/1991 |

OTHER PUBLICATIONS

Houghton, E.L., Carpenter, P.W., Aerodynamics for Engineering Students, Fifth Edition, 2003, p. 567-568, Elsevier Butterworth Heinemann.
Egg Curves, http://www.mathematik.uni-bielefeld.de/~sillke/PUZZLES/egg-curves, Mar. 8, 2012.
Hirst, Ann E. and Keithlloyd, E., Cassini, His Ovals and a Space Probe to Saturn, Sep. 29, 2010, pp. 409-421, The Mathematical Gazette, vol. 81, No. 492.
Willis, Nicholas J., Bitstatic Radar, 2005, Scitech Publishing, Inc., Raleigh, North Carolina, USA.
Phusiol, Jpn J., More numerical results on red blood cell geometry, http://www.ncbi.nlm.nih.gov/pubmedk/6471615?dopt=Abstract, Mar. 9, 2012.
Luo, Qingzheng and Dai, Guangxi, Mass-Asymmetric Breakup in the Extended Finite-Range Macroscopic Model, Chin.Phys.Lett., vol. 11, No. 2, 1994, Institute of Modern Physics, Academia Sinica, Lanzhoue 730000, China.
Cassinian Curve, http:llwww.2dcurves.com/higher/highercc.html, Mar. 8, 2012.
Hurley, Sean M., Signal-To-Noise Ratio Gains and Sychronized Requirements of a Distributed Radar Network, Thesis, Jun. 2006, Naval Postgraduate School, Monterey, California, USA.

(Continued)

*Primary Examiner* — Mark Le
(74) *Attorney, Agent, or Firm* — Polsinelli PC (57)     ABSTRACT

A transportation system having a tube containing hydrogen gas and a vehicle designed to operate within the tube. The vehicle breathes hydrogen from the tube to power fuel cells in order to produce power. The vehicle is suspended above the tube on a low-friction layer and is propelled through the tube via a propulsion system, such as contra-rotating propfans.

12 Claims, 7 Drawing Sheets

(56) References Cited

OTHER PUBLICATIONS

1976 Standard Atmosphere Calculator, http://www.digitalduch.com/atmoscalc, Mar. 9, 2012, digitaldutch.com.
Gas Encyclopedia, http://encyclopedia.airliquide.com/encyclopedia.asp, Mar. 9, 2012.
Gases—Specific Heats and Individual Gas Constants, The Engineering Toolbox, http:www.engineeringtoolbox.com/spesific-heat-capacity-gases-d_159.html, Mar. 9, 2012, www.EngineeringToolBox.com.
Gouse, Jr., S.W.; Noyes, Jr., B.S.; Swarden, M., Aerodynamic Drag on a Body Traveling in a Tube, Prepared for the U.S. Department of Transportation under Contract C-85-65, Department of Mechanical Engineering, Oct. 1967, Engineering Projects Laboratory, Massachusetts Institute of Technology, Cambridge, Massachuseetts, USA.
Earnshaw, P.B., On the Aerodynamic Resistance to Long Trains Passing Through Long Close-Fitting Tunnels, Royal Aircraft Establishment, Technical Report 70199, Nov. 1970, Crown Copyright.
Hammitt, Andrew G., Aerodynamic Analysis of Tube Vehicle Systems, AIAA Journal, vol. 10, No. 3 pp. 282-290, Sep. 29, 1971.
Smith, Leslie David, Experimental Investigation of Tubed Vehicle Aerodynamic Characteristics, Thesis, Apr. 17, 1972, Department of Mechanical Engineering, Duke University.
Davidson, James V., Aerodynamic Drag of Tube Vehicles, Thesis, Aug. 16, 1974, Department of Mechanical Engineering, Duke University.
Gralewski, Zdzislaw Aleksander, The Aerodynamic Drag of Tube Vehicles Travelling at Subsonic Speeds, Thesis, Jun. 1979, Loughborough University of Technology.
Cassat, Alain, Espanet, Christophe, Bourquin, Vincent, Jufer, Marcel, Passive Guidance Forces of Polarized Linear Motors Combined with Levitation Actuators Working in Partial Vacuum—Application to Swissmetro.
Miller, A.R., Hydrogen tube vehicle for supersonic transport: Analysis of the concept, International Journal of Hydrogen Energy, vol. 33, Issue 8, Apr. 2008, Science Direct.
Miller, Arnold R., Hydrogen tube vehicle for supersonic transport: 2. Speed and energy, International Journal of Hydrogen Energy, vol. 35, Issue 11, Jun. 2010, Science Direct.
Minto, David W., CTEIP Funded Advances in Hypersonic Testing at the Holloman High Speed Test Track, 24th AIAA Aerodynamic Measurement Technology and Ground Testing Conference, Jun. 28-30, 2004, Portland, Oregon.
Maddalon, Dal V., Jackson, Willis E. , A Survey of the Transport Properties of the Helium at High Mach Number Wind-Tunnel Conditions, NASA Technical Memorandum, NASA TM X-2020, Langley Research Center, Hampton, Virginia, USA.
Kilgore, Robert A., Goodyer, Michael J., Adcock, Jerry B., Davenport, Edwin E., NASA Technical Note, NASA TN D-7762, Langley Research Center, Hampton, Virginia USA.
Adcock, Jerry B., Real-Gas Effects Associated with One-Dimensional Transonic Flow of Cryogenic Nitrogen, NASA Technical Note, NASA TN D-8274, Langley Research Center, Hampton, Virginia, USA.
Anderson, Jr., John D., Introduction to Flight, Sixth Edition, p. 212, 2008, McGraw Hill.
Shevell, Richard S., Fundamentals of Flights, Second Edition, p. 98, 1989, Prentice Hall.
White, Frank M., Fluid Mehanics, Fourth Edition, p. 577, 1999, McGraw-Hill.
Lide, Ph.D., David R., CRC Handbook of Chemistry and Physics, 88th Edition, 2008, CRC Press.
Hendricks, Robert C., Baron, Anne K., Peller, Idiko C., GASP—A Computer Code for Calculating the Thermodynamic and Transport Properties for Ten Fluids: Parahydorgen, Helium, Neon, Methane, Nitrogen, Carbon Monoxide, Oxygen, Flourine, Argon, and Carbond Dioxide, NASA TN-D7808, Feb. 1975, Lewis Research Center, Cleveland, Ohio, USA.
Atkins, Peter, Shriver and Atkins Inorganic Chemistry, Chapter 10, 2009, Oxford University Press.
Haut, RS, Adcock JB. Cryogenic hydrogen as a wind tunnel test gas. J. Aircraft 1977; 14(12): 1155-1156.
Final report on the National Maglev Initiative. National Transportation Library, US Department of Transportation, Washington, DC, last updated Dec. 6, 2004.
Vincent-Genod J. Fundamentals of pipeline engineering. Houston, TX: Gulf Publishing Company, 1984.
Liu H. Pipeline engineering. Boca Raton, Florida: CRC Press, 2003.
Schimming P. Counter rotating fans: an aircraft propulsion for the future?. J. Thermal Science 2003;12(2):97-103.
Neely M. "Antonov An-70," 2007. Website: http://www.theaviationzone.com.
Jackson P, editor-in-chief. Jane's All The World's Aircraft. Alexandria, VA, 2004.
Larminie J, Dicks A. Fuel cell systems explained. Chichester, England: John Wiley, 2000.
Gross WA, Matsch LA, Castelli V, Eshel A, Vohr JH, Wildmann M. Fluid film lubrication. New York: John Wiley & Sons, 1980.
Devitt D. Air bearings eliminate static friction and stick-slip that compromise precision. Machine Design Magazine, 2004.
Szeri AZ. Fluid film lubrication. Cambridge, UK: Cambridge University Press, 1998.
Meier RC, Smith AF. Feasibility study of air bearing rocket sled slippers. Air Force Missile Development Center Technical Report, Holloman Air Force Base, New Mexico, 1966.
Airfloat, LLC, c. 2006. Website: http://www.airfloat.com.
Abbott T. Airfloat, LLC, personal communication, Jul. 31, 2007.
Slocum A, Basaran M, Cortesi R, Hart AJ. Linear motion carriage with aerostatic bearings preloaded by inclined iron core linear electric motor, Precision Engineering 2003, 27: 382-394.
Gibbs P, Geim A. Is magnetic levitation possible? Mar. 18, 1997. Website: http://www.weburbia.com/physics/levitation.html.
Cartland H, Fiske P, Greenwood R, Hargiss D, Heston P, Hinsey N, Hunter J, Massey W. The SHARP Scramjet Launcher. Lawrence Livermore National Laboratory. Jan. 10, 1995.

* cited by examiner

SUPERSONIC HYDROGEN TUBE VEHICLE

CROSS REFERENCE

This application is a non-provisional application claiming priority under 35 U.S.C. §119(e) to U.S. Provisional Application No. 61/202,152 titled "Supersonic Hydrogen Tube Vehicle" and filed on Feb. 2, 2009, which is hereby incorporated by reference.

BACKGROUND

There are many ways to transport both people and goods, for instance, airplanes, automobiles, and trains. The length of time that a trip may take is often a determining factor for the type of transportation that may be used, and there is a demand for shorter travel times between destinations. In addition to travel time, many consumers choose their method of transportation based on cost and consumers will often choose one airline carrier over another based on ticket price. The efficiency of a method of transportation plays a big role on costs passed on to consumers. For instance, when the price of aviation fuel increases, some airlines also increase the cost of tickets. Additionally, consumers are more environmentally conscious and are looking to alternative energy modes of transportation when making their transportation decisions.

Business travelers are primarily concerned with speed, and automobiles are not the first choice for long distance travel. Such consumers really have only one travel option: flying.

The speed of commercial aircraft, however, is practically limited by the speed of sound, because as an airplane speeds up and begins to approach the speed of sound, it enters a speed region known as the transonic region. When the airplane enters the transonic region, parts of the airflow over the airplane's surface are subsonic and parts are supersonic. Air is strongly compressible near the speed of sound and the supersonic parts emanate shock waves that are approximately normal to the surface of the airplane. The shock waves increase drag (wave drag) and decrease lift. Thus, as the speed of the aircraft varies as it accelerates through the transonic region, movement of the waves on the surface causes buffeting. The wave drag gives rise to a power peak at Mach 1 called the "sound barrier." After the airplane passes through the transonic region, the stability of the vehicle improves and the power requirement drops temporarily below the power peak of the sound barrier. Nonetheless, the power continues to rise with speed and, due to wave drag, is much higher than at subsonic speeds. Indeed, the power in the supersonic region rises at more than the third-power of speed. The additional power requirements make supersonic airplanes prohibitively expensive to build and operate, especially for commercial use. This means that in order to increase their speed past the speed of sound, aircraft must use significantly more fuel, charge higher prices for either passengers or cargo in order to make up for the increases in fuel usage, and will expel more emissions into the environment.

The foregoing examples of the related art and limitations therewith are intended to be illustrative and not exclusive. Other limitations of the related art will become apparent to those of skill in the art upon a reading of the specification and a study of the drawings.

SUMMARY

Aspects of the present disclosure involve a vehicle configured to operate in a tube provided with a hydrogen atmosphere, which allows a higher sonic speed and dramatically lower drag. The vehicle breathes hydrogen from the tube and uses the hydrogen to power fuel cells to provide propulsion power. The vehicle is propelled through the tube by a propeller and essentially "flies" in the hydrogen atmosphere on top of a low-friction fluid film or magnetic field.

One particular aspect of the invention involves a transportation system including a substantially enclosed conduit and a vehicle dimensioned to fit within the conduit. The conduit, e.g. a concrete or steel tube, is provided between a first geographic location and a second geographic location. The enclosed conduit is provided with an atmosphere, such as hydrogen gas or methane gas, either of which may serve as fuel for a fuel cell. The vehicle comprises a propulsion system coupled with a motor receiving power from at least one fuel-cell stack. The fuel-cell stack(s) are configured to receive and consume hydrogen from the atmosphere of the enclosed conduit. The vehicle further utilizes a levitation system configured to levitate the vehicle within the enclosed conduit.

Another aspect of the invention involves a vehicle including at least one fuel-cell stack. A motor is operably coupled with the fuel-cell stack(s) and configured to receive power from the fuel-cell stack(s). The vehicle includes an oxidant storage tank to provide oxygen to the fuel-cell stack. An intake mechanism is configured to receive a gas, such as hydrogen or methane, from an atmosphere in which the vehicle is traveling, the gas being the fuel (or reductant or reducer) source for the fuel-cell stack(s). A propeller is coupled and driven by the motor, directly or indirectly through some form of transfer mechanism or transmission. The vehicle also includes a levitation system, such as aerostatic bearings or magnetic levitation system that levitates the vehicle.

The following embodiments and aspects thereof are described and illustrated in conjunction with systems, tools, and methods that are meant to be exemplary and illustrative, and the embodiments and aspects described and illustrated are not intended to be limiting in scope. In various embodiments, one or more of the above-described problems have been reduced or eliminated, while other embodiments are directed to other improvements. In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting. The use of the same reference numerals in different drawings indicates similar or identical items.

DETAILED DESCRIPTION

Aspects of the present disclosure involve a vehicle capable of supersonic travel (relative to air outside the tube) that "flies" in a substantially enclosed tube provided with a hydrogen atmosphere. The tube is intended to be as enclosed and its interior isolated from air outside the tube as completely as is practicable, up to, for example, flaws in manufacturing or fabrication (e.g., pinholes in welds). The vehicle includes one or more fuel cells as a power source for the vehicle, and the fuel cells use the hydrogen or other gases within the tube as a fuel source. Further, by traveling in a hydrogen atmosphere, the vehicle may travel faster than the speed of sound with respect to air outside the tube without exceeding the sound barrier within the hydrogen atmosphere. Hydrogen has a higher speed of sound than air by a factor of 3.8, which delays the onset of the sound barrier. For instance, Mach 1.2 in air corresponds to only Mach 0.32 in hydrogen. Hence, the vehicle may reach Mach 1.2 (with respect to air) while remaining subsonic in the hydrogen atmosphere. To "fly" the vehicle will involve utilization of a levitation apparatus that may include aerostatic gas bearings, magnetic levitation, or the like, and that cooperates with a guideway within the tube such that the vehicle levitates above the guideway within the tube. Aerostatic gas bearings use a gas pump to force gas through the bearings and do not depend on vehicle-guideway relative velocity to provide gas pressure; an aerostatic gas-bearing vehicle can therefore hover. At least one embodiment of magnetic levitation, for example, AC-electromagnet levitation, can analogously hover. The fuel cell powers a propfan or other propulsion system to propel the vehicle within the tube while levitating.

Figure 1:
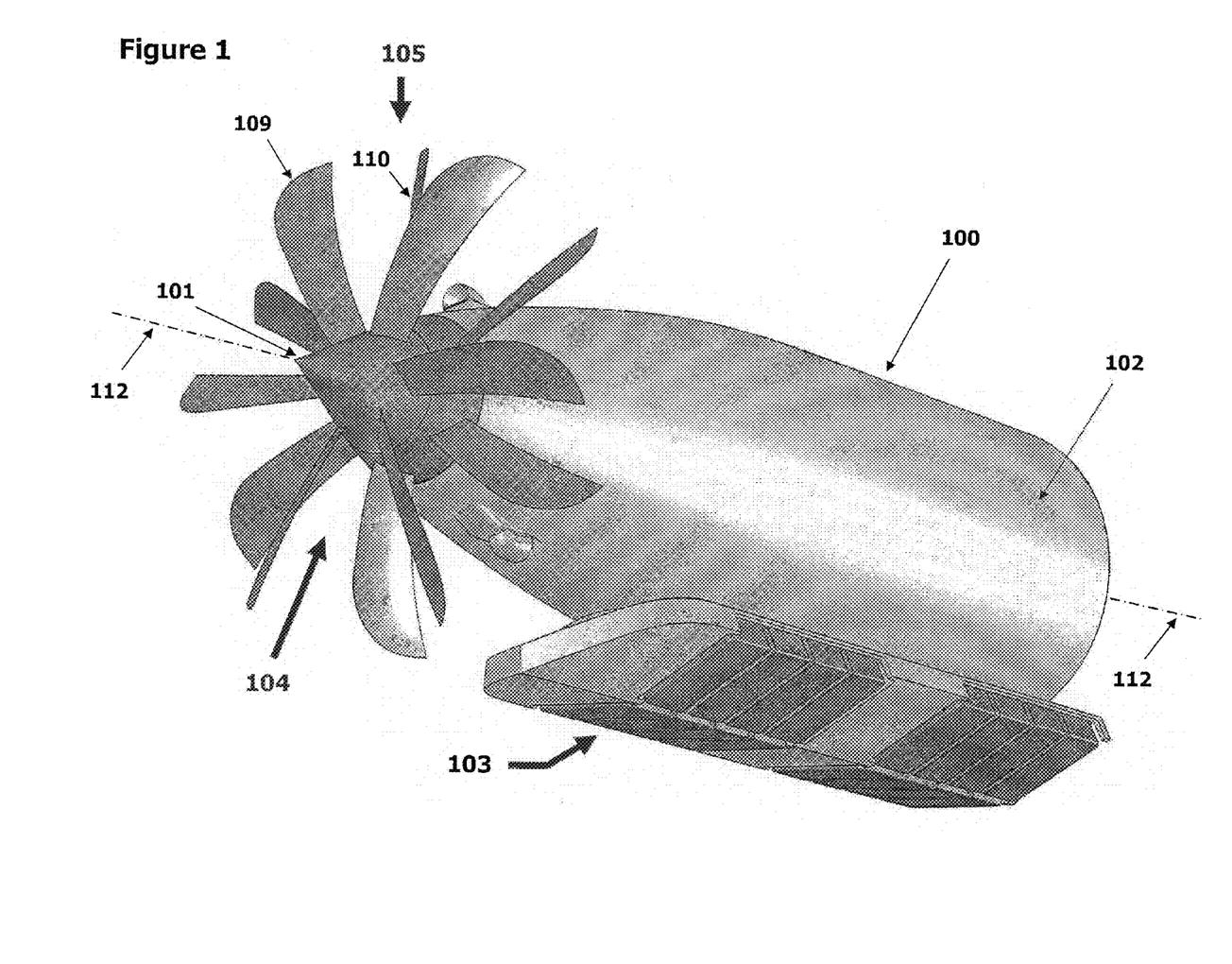
FIG. 1 is an isometric view of the vehicle.

FIG. 1 illustrates an isometric view of a tube vehicle 100 conforming to aspects of the disclosure. The vehicle 100 includes a body 102 supporting and housing various components of the vehicle, including a levitation system 103 and a propulsion system 104. Generally speaking, the body 102 defines a cone-like aerodynamic shape. Nonetheless, the body 102 may be any shape and similarly may be constructed of any suitable material, including aircraft grade aluminum or carbon-fiber materials. The body 102 is generally cylindrical and tapering to a tip region 101. The propulsion system 104 in this embodiment is provided at the tip region 101 of the vehicle 100. The vehicle of FIG. 1 can be thought of as a "locomotive" in that it includes the propulsion system as well as associated motors and fuel systems, and additional unpowered cars may be coupled between locomotives 100 for cargo or passenger transport.

Figure 2:
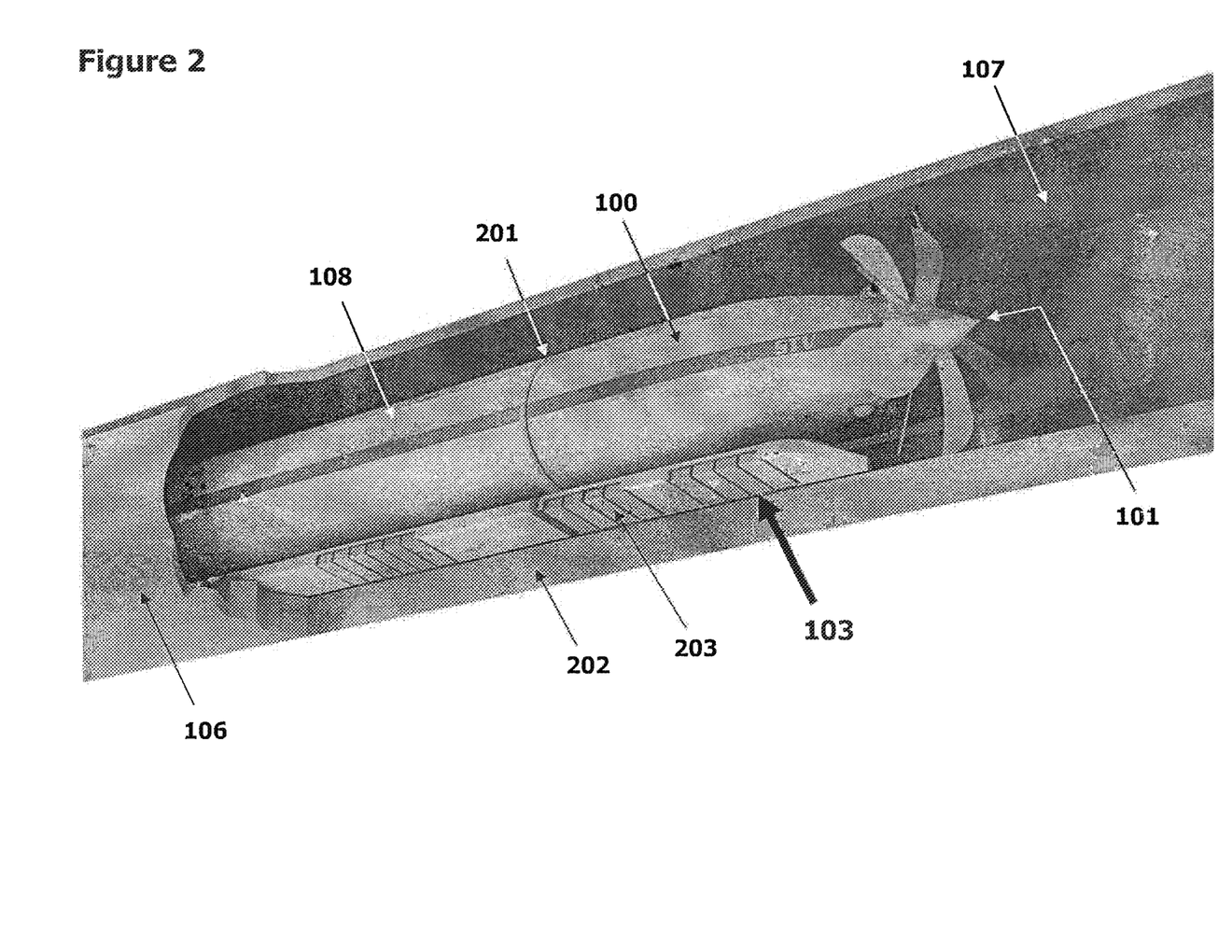
FIG. 2 is an isometric view of the vehicle within the tube.

FIG. 2 illustrates an isometric view of the vehicle 100 within a tube 106. In one particular implementation, due to the possibility of achieving high speeds, the vehicle 100 in effect flies within the tube 106. The vehicle 100 does not, however, have conventional wings. Instead, the vehicle 100 is elevated by way of the levitation system 103, which in one particular implementation is an aerostatic gas-bearing arrangement. The tube 106, as discussed herein, includes or otherwise defines a guideway 202, or "vee-way," that matches the shape of the aerostatic bearings or other levitation system. The term "vee-way" derives from the terminology of machine tools (c.f., the "ways" or "vee-ways" of a lathe), and in this disclosure, the shape of the "way" is not necessarily in the shape of a "V" but could have other shapes such as a semicircle (or "U") or a rectangle. The guideway 202 is not necessarily integral to the tube but may be a separate structure that may be attached to the tube 106 by welding, fasteners, or other methods of attachment. The aerostatic gas-bearing arrangement forces gas, or other fluids, through small orifices against a surface, such as a vee-way, and thereby creates a small gap between the bearings and the vee-way to levitate the vehicle 100 within the tube 106.

In another implementation, the vehicle 100 may travel through the tube 106 while supported by magnetic levitation, with appropriate magnetic system components included on the vehicle as well as the guideway 202. The tube 106 will have an appropriate guideway, generally analogous to the above-described vee-way for aerostatic gas-bearing levitation, and the vehicle 100 levitates above the guideway on a magnetic field rather than a fluid film. In these embodiments, the guideway includes magnetic material and the vehicle 100 has magnetic materials installed on the bottom of the vehicle 100, for instance, where the levitation system 103 is located.

As shown in FIG. 1, the vehicle 100 includes some form of a propulsion system 104. In the embodiment discussed herein, the propulsion system 104 involves a propeller arrangement 105 that propels the vehicle 100 within the gas-filled tube 106. The propeller arrangement 105 may have a single set of rotating blades, contra-rotating blades, axial-fan blades, or any other blade configuration suitable for propelling the vehicle 100. The propeller arrangement 105, in one implementation includes two sets of blades 109, 110 that rotate along a centerline 112 of the body 102 of the vehicle 100. The two sets of blades rotate in opposite directions with respect to each other. However, in other implementations, the propeller arrangement 105 may include a single set of blades that rotates in a single direction.

In some embodiments the propeller arrangement 105 has a diameter of approximately four meters. The diameter of the propeller arrangement 105 may be a function of the size of the tube 106 and increases and decreases as the tube 106 diameter increases and decreases. This embodiment allows the diameter of the propeller arrangement 105 to be optimized. Propeller efficiency is defined as $$\eta = TV/P_s$$

where T is thrust, V is the velocity of the vehicle, and $P_s$ is the shaft input mechanical power. The Froude momentum theory of propulsion assumes that the operating gas is accelerated by an infinitely thin "actuator disc" of area S that provides energy to the gas but offers no resistance to gas as it passes through it. In unit time, the mass of gas passing through the actuator disc is $$m = \rho S V_0$$

where $\rho$ is density of the gas, and $V_0$ is the gas velocity at the immediate rear of the disc. The increase of momentum of the mass of fluid, and hence the thrust T on the disc is $$\Delta(mv) = T = \rho S V_0 (V_s - V)$$

where V is the gas velocity far ahead of the disc, $V_s$ the gas velocity far behind the disc. Therefore, after several steps of derivation, the ideal efficiency ($\eta_i$) of the actuator disc is given by $$\eta_i = 2/(1 + V_s/V).$$

An important fact shown by this equation is that the propeller efficiency is independent of gas density. Thus, the efficiency of the propeller will not necessarily be changed by operating in hydrogen rather than in air. It can also be shown mathematically and from experiment that the propeller advance ratio, which is a function of propeller diameter and rotational frequency, may require adjustment for different gas densities. Hence, the hydrogen atmosphere may require a different (larger) propeller diameter and/or (higher) rotational frequency to attain the same efficiency as a propeller operating in air. The same is true for water propellers compared to air propellers: waterborne ship propellers are of similar efficiency but are smaller and slower-turning than comparable-power airplane propellers.

Additionally, from consideration of the kinetic-energy imparted to the slipstream, which should be minimized, the larger the diameter of propeller arrangement 105, the greater the potential propeller efficiency. However, as the diameter increases for a given rotational frequency (speed), the propeller tips will eventually enter the transonic region, and the considerations discussed above regarding dynamic instability and high power associated with the transonic region will apply to the propeller blades. Moreover, because the propeller traces out a helix as the vehicle advances, a vector component of rotational velocity must be added to vehicle translational velocity, and hence the blade-tip velocity exceeds the vehicle velocity. It is for this reason that propeller tip speed limits the speed of a propeller-driven vehicle, and a higher propeller diameter may require a lower rotational frequency.

Other forms of propulsion may be used in place of the propeller arrangement 105. For instance, the vehicle 100 may be powered by a motor, engine, and the like. If the vehicle 100 uses magnetic levitation, then the vehicle 100 may alternatively be propelled by a linear synchronous or linear induction motor. The stator of such a linear AC motor may be either on the vehicle 100 or on the guideway 202; the linear equivalent of the rotor of a rotating AC induction or synchronous motor will be placed on the element opposite the stator. For example, if the stator is placed on the vehicle 100, then the linear-equivalent of the rotor will be placed on the guideway 202 (see FIG. 2).

As described above, FIG. 2 illustrates an isometric view of the vehicle within the tube 106. In embodiments discussed herein, the tube 106 is substantially filled with hydrogen 107 and carries the guideway 202 at the bottom of the tube 106. While the vehicle may have sufficient space onboard for passengers and/or cargo, in this example, the vehicle 100 is operating as a locomotive to pull one or more cars 108. The tube 106 is built to the appropriate dimensions such that the vehicle 100 can fit completely inside the tube 106. The tube 106 may be constructed similarly to a pipeline for natural gas, oil, or water. For instance, the tube 106 may be constructed of concrete, metal or other suitable materials. The tube 106 may also include various types of seals to prevent the hydrogen 107 from escaping the tube. The seals may be any type of conventional material used to prevent air/gas from escaping an enclosed area. For instance, sealing may be provided by elastomers, concrete layers, rigid panels, or the like. The tube 106 may inherently have sufficient gas-tight properties (e.g., a welded metal tube) so as to not require additional/separate seals. In some embodiments, the tube 106 may be sealed, in order to create a consistent environment for the vehicle 100 to travel, as well as to prevent impurities from entering the tube 106. Furthermore, in these embodiments, the tube 106 may also contain air locks or other sealed entryways that allow the tube 106 and vehicle 100 to be accessed from different locations.

The tube 106 may also include a purification system to remove impurities, such as water that inadvertently slips through the vehicle water-collection system or air that escapes around the air-lock seals, as well as other unwanted materials, from the hydrogen atmosphere 107 within tube 106. The purification system may utilize conventional purification hardware, such as pressure-swing-absorption, hydrogen palladium filters, or hydrogen catalytic combustors, through which the tube hydrogen may slowly pass. Alternatively, the hydrogen atmosphere 107 may be slowly replaced by at least two methods: first, as hydrogen is consumed by vehicles operating in the tube, the vehicles may collect water contamination from the hydrogen 107 by breathing the hydrogen and then passing it through the fuel cells and the onboard water collection system, and purer make-up hydrogen will necessarily be added to the tube 106; the result will be slow replacement of relatively impure hydrogen in tube 106 by purer make-up hydrogen; second, pure hydrogen in excess of that needed to replace the hydrogen consumed by the vehicles may be added to tube 106, and at another point along tube 106, less pure hydrogen may be drawn off; the result will also be slow replacement of relatively impure hydrogen 107 in tube 106 by purer hydrogen.

As discussed above, the tube 106 contains hydrogen 107. In the particular embodiment discussed herein, this hydrogen gas environment provides the vehicle 100 with a source of fuel. Hydrogen 107 is used within tube 106 as the vehicle 100 can travel within the hydrogen atmosphere at supersonic speed with respect to air outside the tube while remaining subsonic inside the tube; the low density of hydrogen results in about 14-fold lower drag for the vehicle relative to the outside air; and the high thermal conductivity of hydrogen facilitates heat rejection from the vehicle compared to heat rejection to air.

The hydrogen 107 within the tube 106 may be maintained at a pressure slightly above atmospheric pressure. For example, the pressure within the tube 106 may be maintained at about 0.05 bar above ambient atmospheric pressure. The relatively higher pressure inside of tube 106 assures that hydrogen 107 would leak out of the tube 106 through any inadvertent breach (e.g., crack, pinhole leak in a weld, or similar breach) in tube 106, rather than have the outside air atmosphere and other elements leak into the tube 106, thereby maintaining a safe working environment for vehicle 100. An objective of not allowing air to leak into the tube 106 is that by keeping the concentration of hydrogen at or above 75% (by volume), the hydrogen 107 will be held above the upper flammability limit of hydrogen and the hydrogen 107 will be too rich to burn.

Other gases than hydrogen may be used as the atmosphere within the tube 106. The ideal properties of such a gas are that the density be lower than that of air at a given pressure and that the gas can serve as a fuel for the propulsion fuel cells for vehicle 100 operating inside of the tube 106: the speed of sound in a gas increases as the density decreases and the drag decreases as the density decreases. One embodiment of an atmosphere alternative to hydrogen is methane, or natural gas, which is substantially methane. The density of methane at a given pressure is less than half the density of air at the same pressure, and methane can be used as a fuel for fuel cells. As for hydrogen above, the pressure of the methane within tube 106 may be maintained slightly above air pressure outside the tube 106, and thereby any inadvertent leakage through tube 106 would be leakage of methane to the outside of tube 106 rather than leakage of air into tube 106. Analogously to the substantially hydrogen filled tube 106, 107, an objective of not allowing air to leak into the substantially methane-filled tube 106 is that by keeping the concentration of methane at or above about 17% (by volume), the methane will be held above the upper flammability limit of methane and the methane within tube 106 will be too rich to burn. The methane breathed by the vehicle 100 may be converted to hydrogen onboard the vehicle 100 by a steam reformer, or similar chemical processor, and the hydrogen then supplied to the fuel cell to provide propulsion power; alternatively, some fuel cells, for example, solid-oxide fuel cells, may operate directly on methane (by internal reforming). In this embodiment using methane as the atmosphere within tube 106, the products of the chemical processes onboard the vehicle 100 are both water and carbon dioxide, and in one embodiment, the carbon dioxide may be chemically trapped onboard the vehicle 100 and thereby not released into the tube 106. The technique may use any method of trapping carbon dioxide, for example, converting it to a liquid or solid or chemically trapping it as a product such as a carbonate. In the case of trapping the carbon dioxide as a carbonate, the carbon dioxide may be readily reacted with a strong base such as calcium hydroxide to give the solid calcium carbonate. In this embodiment, the trapped carbon dioxide may be stored onboard the vehicle 100 until the end of a run, at which time it would be removed from the vehicle 100 to make room for more trapped carbon dioxide on a subsequent run of the vehicle 100.

Helium may also be used as the atmosphere within the tube 106. Having a density twice that of hydrogen but about seven times less than air, it would provide a lower operating gas density than air for the vehicle 100 and would thereby give a higher sonic speed than air outside the tube 106 and lower drag than air outside the tube 106. However, it would not be as good in this regard as hydrogen, and because helium is an inert gas, it would not be useable as a fuel for the onboard propulsion fuel cells of the vehicle 100.

Figure 3:
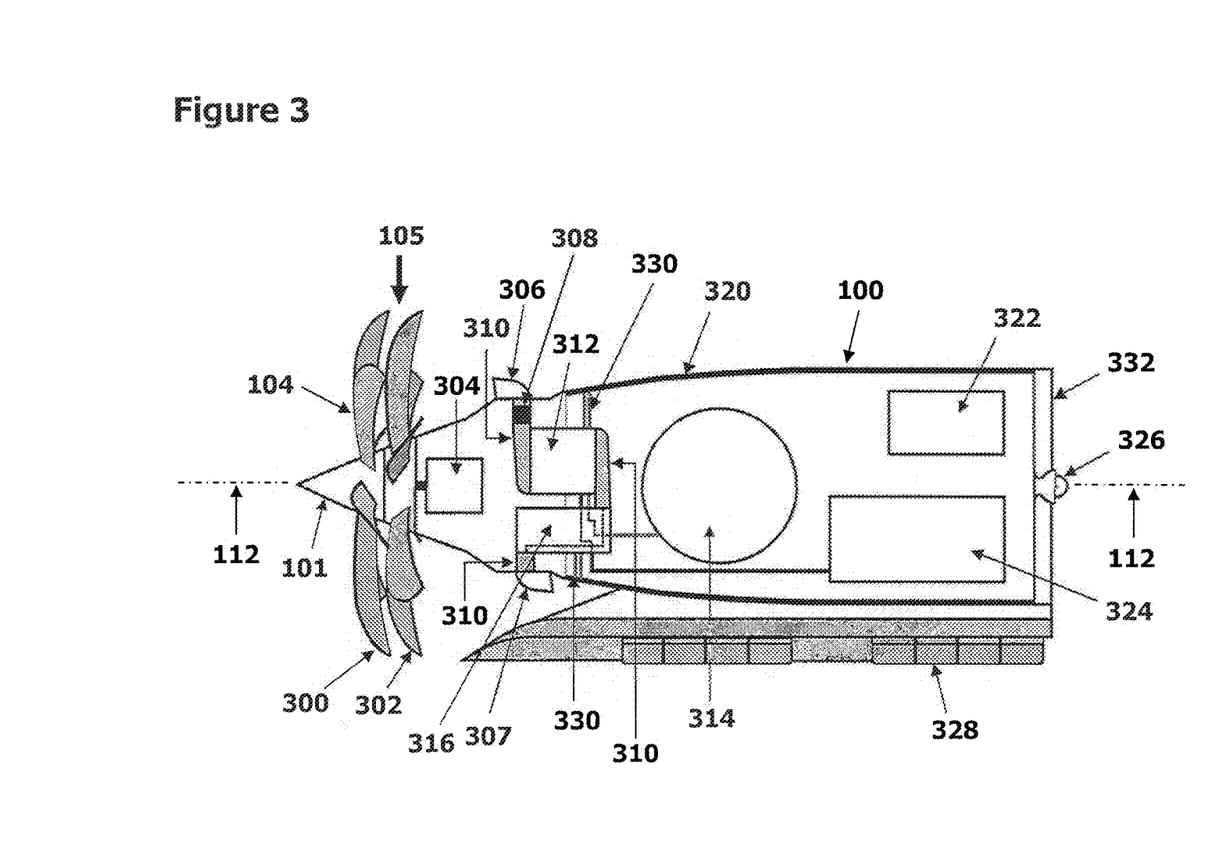
FIG. 3 is a block diagram illustrating the functional components of the vehicle.

FIG. 3 is a block diagram illustrating the functional components of the vehicle 100. Discussing first the front of the vehicle 100, the propeller arrangement 105 provides vehicle propulsion. The propeller arrangement 105 includes a first set of blades 300 and a second set of blades 302, and these blades 300, 302 are configured to rotate about a common axis 112 defined generally along the longitudinal centerline of the vehicle 100. Each set of blades is coupled with a common propulsion motor 304, although distinct propulsion motors for each set of blades 300 or 302 are possible. The propulsion motor(s) 304 may be either DC or AC electric motors, hydraulic motors, or the like. The first and second sets of blades 300, 302 each include six blades concentrically and evenly spaced about the common axis. The motor 304 drives the first set of blades 300 in one direction, e.g., clockwise, and the second set of blades 302 in the opposite direction, e.g., counterclockwise. In this arrangement, the contra-rotating blades help to reduce energy losses due to the unproductive rotation of the slipstream and this arrangement is more efficient than propellers having a single set of non-contra-rotating blades. Additionally, the contra-rotating blade sets 300, 302 may produce minimal to zero net torque on the vehicle 100. This feature helps to prevent inadvertent contact between the guideway 202 and the levitation system 103 should torque be introduced into the system, especially at vehicle 100 startup. In other embodiments, the propeller arrangement 105 may have a single set of blades. In this embodiment, the propeller arrangement 105 may be a single rotating propeller; the advantage of this embodiment is that the propeller arrangement 105 produces less noise than the contra-rotating double blade-set propellers, has a simpler drive mechanism than contra-rotating propellers, and is less expensive.

Additionally, the levitation system 103 and propulsion system 104 may use small-diameter rollers, like the rolling elements of roller bearings, which operate like wheels on the guideway 202.

The blades of each of the first and second blade set 300, 302 are connected to the body of the vehicle 100 at the tip region 101 of the body 102. The blade arrangements 300, 302 may be provided with more or fewer blades, and in some instances more blades (e.g., 7 instead of the 6 shown) may facilitate an increase in propeller efficiency or result in less noise. Similarly, in some embodiments, the wider the blades 300, 302 and the more uniform the thrust distribution on the blades 300, 302, the higher the efficiency of the propeller arrangement 105. Similarly, the blades 300, 302 may be shaped in a swept-back configuration as in a supersonic wing, and have an angular shape with a sharp leading edge, which together allow a higher vehicle speed at which shock waves from the propeller become limiting.

In addition to driving the vehicle 100, the propeller blades 300, 302 may be used to brake and stop the vehicle 100 or reverse the direction of the vehicle 100. For example, braking of the vehicle 100 may be implemented by increasing the pitch of the propeller blades 300, 302 beyond the feathered position. Reversal of the vehicle may involve rotation of the blades 300, 302 by 180° around their radial axes, followed by reversal of rotational direction of the propellers 300, 302. Once the vehicle 100 is slowed (braked) by changing the propeller pitch, as described above, the method of reversing vehicle 100 by rotation of the blades 300, 302 by 180° around their radial axes, followed by reversal of rotational direction of the propellers, may be used to bring the vehicle 100 to a complete stop. This feature allows the vehicle 100 to levitate within the tube 106 and still be able to stop without relying on friction brakes, which can produce significant amounts of heat and suffer wear. However, friction brakes, or an equivalent mechanical form of braking, may be used to hold the vehicle 100 in place on the guideway once it has been braked and stopped by the propellers 300, 302. In any case, the vehicle 100 may be stopped or put in reverse in any manner. For instance, the vehicle 100 may use friction brakes, magnets, or the like placed on the levitation system 103 or on the bottom of the vehicle 100, to stop the vehicle 100. Similarly, the vehicle 100 may use a second propeller located at the rear of the vehicle 100, which propeller set is normally configured to provide propulsion supplementing the front propulsion system. Besides providing a stopping force, such a configuration may also propel the vehicle 100 in reverse.

The motor 304 drives the propeller arrangement 105. The motor 304 is powered by a fuel-cell stack 312. It is possible to use other power sources or supplement the fuel-cell stack 312 power output. However, in the implementation discussed herein, the fuel-cell stack 312 synergistically "breathes" the hydrogen 107 within the tube 106 as its fuel source. The motor 304 may be any device capable of using energy or electricity to drive the propeller 104. For example, the motor can be an alternating-current (AC) motor, a direct current (DC) motor, a hydraulic motor, and the like. In one embodiment, the motor 304 is an AC induction motor.

To collect hydrogen gas 107 (or other gas such as methane) from the tube 106 for use in the fuel cells of the vehicle 100, an intake scoop 306 is provided on the vehicle 100 near the propeller arrangement 105. The intake scoop 306 collects hydrogen 107 from the tube 106 and directs it into the fuel-cell stack 312 in a flow-through manner. To exhaust excess hydrogen from the vehicle 100, an exhaust scoop 307 is provided, in one embodiment, on the diametrically opposite side of the vehicle 100. The diametric disposition of scoops 306, 307 is illustrative and not intended to be limiting, and any angle formed between scoops 306, 307 and the vehicle centerline 112 may be used. The exhaust scoop 307 releases excess hydrogen 107 not consumed by the fuel-cell stack 312 from the vehicle 100 to the tube 106. Each scoop may be rotated by 180° when the vehicle 100 reverses direction of travel. That is, in order to maintain hydrogen flow in a fixed direction through the fuel-cell stacks, if scoop 306 is the intake scoop in one direction, it may be rotated by 180° when the vehicle 100 reverses direction, and thereby it will continue to be the intake scoop. It will continue to be the intake scoop because the direction of the hydrogen airstream relative to the vehicle 100 has changed by 180°.

The intake scoop 306 and the exhaust scoop 307 are oriented in opposite directions. The intake scoop 306 faces the front of the advancing vehicle and hence hydrogen 107 is rammed into the scoop and delivered to the fuel-cell stacks. The exhaust scoop 307 faces toward the rear of the advancing vehicle 100 and hence the relative motion of the vehicle 100 and hydrogen 107 tend to suck the hydrogen flowing through the stacks 312 into tube 106. The effects of ramming and sucking work together to distribute hydrogen through the fuel-cell system in a passive manner. The intake scoop 306 and the exhaust scoop 307 may be constructed out of suitable material for withstanding the high gas pressure of high speeds. The intake scoop 306 and the exhaust scoop 307 may be any shape capable of receiving and dispersing hydrogen 107 to and from the tube 106. In some embodiments, the intake 306 and the exhaust 307 may be shaped as open rectangular vents. For the combined ramming and sucking effects to work in each direction of vehicle 100 travel, the intake 306 and the exhaust 307 are designed to rotate by 180° when the vehicle 100 changes direction from forward to reverse.

A fan 308 assists the intake 306 in pulling hydrogen 107 from the tube 106. For example, when the vehicle 100 is not moving or is moving slowly, the intake 306 may not be able to passively breathe as much hydrogen 107 as is necessary to operate the fuel cells 312. In these instances, the fan 308 turns on and pulls hydrogen 107 through the intake 306 using suction or other means. The fan 308 is located in a duct system 310 that channels hydrogen from the intake 306 to the fuel-cell stack 312. The fan 308 may be an axial fan, a squirrel-cage fan, a pump, or the like. In some embodiments, the fan 308 may only operate when the vehicle 100 is traveling at low speeds or is stopped. In other embodiments, the fan 308 may operate at all vehicle 100 speeds, such that the hydrogen 107 intake flow through scoop 306 is maximized or otherwise controlled.

The duct system 310 transports gas 107 from the intake 306 to the fuel cells 312 and from the fuel cells 312 to the exhaust 307. The duct system 310 may involve piping, tubing, or any suitable conduit that transports the hydrogen 107 from outside the tube 106, to within the vehicle 100 and then directs the unused or excess hydrogen 107 back into the tube 106. However, the duct system 310 may be omitted, for instance, the intake 306 and exhaust 307 may directly connect to the fuel cells 312 and to the tube 106 environment, without the additional piping or tubing.

As discussed above with respect to the motor 304, the fuel-cell stack 312 supplies power to drive the motor 304. A fuel cell uses hydrogen and oxygen to generate electricity. The fuel cells in stack 312 receive hydrogen 107 from the tube 106 via the intake 306 and receive oxygen from an oxidant storage container 314 onboard the vehicle. In some embodiments the fuel cells 312 are an acid-electrolyte proton-exchange membrane type, wherein liquid oxygen provides oxygen (the oxidant) to the fuel cells and the fuel-cells' fuel, hydrogen (the reductant or reducer), is breathed from the tube 106. In these embodiments, hydrogen flows through the fuel-cell stacks, in the manner described above by the action of the scoops 306, 307, and oxygen is dead-ended. The fuel-cell stack 312 produces electricity when hydrogen at the anode gives up electrons to an external circuit plus positively charged hydrogen ions that move through an electrolyte (not illustrated) within the fuel cells of stack 312 and combine with the oxygen to produce water at the cathode. As the oxygen is dead-ended, water is produced at the cathode as a waste product of the electricity production of the fuel cells 312. This embodiment allows the water produced by the fuel-cell stack 312 to be stored onboard in a waste storage container 324, versus being exhausted into the tube 106. Excess hydrogen gas that is not used in the energy conversion process is expelled back into the tube 106 via the exhaust scoop 307. However, the fuel cells of stack 312 may be any fuel-cell type that uses hydrogen and oxygen as fuel sources. More generally, the fuel cells may use any gaseous fuel that provides the atmosphere within tube 106, for example, methane. Examples of fuel-cell types are alkaline fuel cells, phosphoric acid fuel cells, molten carbonate fuel cells, solid oxide fuel cells, and the like. There may be any number of fuel cells within stack 312. For instance, to increase the power of the vehicle, more fuel cells may be added to stack 312 or the size of the fuel-cell electrodes in stack 312 may be increased, depending on the power requirements of the vehicle 100.

The oxidant storage tank 314 holds the oxidant required to operate the fuel cells of stack 312. The oxidant storage tank 314 may be any type of storage device suitable for storage of a compressed gas, a cryogenic liquid, a chemical oxygen source such as hydrogen peroxide, or the like. In one embodiment, the fuel storage tank 314 holds liquid oxygen in a vacuum-insulated storage tank; however, the oxidant storage tank 324 may be used to hold oxygen gas, chemical precursors of oxygen, or other desired oxidant capable of reacting with hydrogen. The fuel cells 312 combine oxidant from the oxidant storage tank 324 with the hydrogen 107 collected from the tube 106 via the intake scoop 306.

A water separator 316 may separate water from cathodic oxygen and remove traces of water from the hydrogen exit stream through scoop 307. For instance, in some embodiments, the separator 316 separates water from cathodic oxygen and runs the separated water to storage tank 324. The separator 316 may also function to condense unwanted materials and thereby prevent them from entering the tube 106. For instance, the separator 316 may also remove traces of water from the hydrogen exiting the fuel-cell stack 312. One embodiment of the separator is also used as an evaporator to convert liquid oxygen stored onboard to gaseous oxygen used by the fuel cells; the cold liquid oxygen on one side of a heat-exchange surface causes freezing of the impurities, for example, water, on the other side of the heat-exchange surface.

A set of coolant lines 330 supply waste heat from the fuel cells and other components to the liquid-oxygen evaporator within separator 316 and then expel the excess heat to the hydrogen 107 via a liquid-gas heat exchanger 320. The source of waste heat is primarily from the fuel cells, the propulsion motor(s), and the power electronics.

A heat exchanger 320 is connected to the coolant lines 330 and may be used to reject excess heat from the fuel cells, the propulsion motor(s), and the power electronics to the hydrogen atmosphere in the tube 106. Because of the high thermal conductivity of hydrogen (seven times greater than air), the heat exchanger in one embodiment is simply a thin shell on the outside of the body 102. In contrast, liquid-air heat exchangers, for example, the radiator of an automobile, require a greater surface area than this embodiment because of the seven-fold lower thermal conductivity of air versus hydrogen.

The power electronics subsystem 322 changes and controls the voltage of the DC output from the fuel cells 312 to the voltage, DC or AC, as required by the propulsion motor 304, vehicle communications systems, vehicle control systems, passenger-car HVAC and lighting systems, and all other electrical components on the vehicle 100.

Waste water produced from the reaction of hydrogen and oxygen within the fuel cells is directed towards a water storage container 324. The water storage container 324 is connected to the separator 316. The waste storage container 324 may be constructed out of any type of material suitable to store water, for instance, plastic, metal, or the like. Waste water storage, in one embodiment, is provided by a horizontally orientated cylinder and may have a volume of about 1500 liters. However, depending on the desired trip length of the vehicle 100, the size of the vehicle 100, the type of fuel cells used, etc., the waste storage container 324 may be designed to hold more or less volume.

The levitation system 103 in this embodiment utilizes aerostatic gas-bearings 328 that may collectively be comprised of smaller bearing units such as segments, as described below. Hydrogen gas is pumped through porous gas bearings 328 and the flow of hydrogen, or other gases such as methane or helium, between the bearing surface and the vee-way surface levitates the vehicle 100. Thus, the vehicle 100 levitates on a low friction fluid film provided by gas-bearings 328.

A coupler 326 is used to connect multiple vehicles together, as well as connect the vehicle 100 to passenger or cargo cars. For instance, as illustrated in FIG. 2, the vehicle 100 may act as a locomotive and pull other cars. In the implementation shown herein, the locomotive tube vehicle is conically shaped with the propeller arrangement 105 located at a tip area 101 of the body 102, and the coupler 326 is positioned at a planar area 332 at the rear of the vehicle 100, opposite the tip 101. A car 108, as shown in FIG. 2, is cylindrical with a circumference matching that of the area of the locomotive adjacent to the planar area. The car 108 has generally planar front and rear areas to minimize the gap 201 between car 108 and locomotive 100 and thereby reduce aerodynamic drag. The gap 201 may furthermore be covered by a thin flexible seal to further reduce aerodynamic drag. In these embodiments, for a consist of two locomotives (one front and one rear) and one or more cars 108, the coupler 326 attaches the locomotives 100 to one or more passenger cars 108, and passenger cars to each other, allowing the vehicle 100 to pull the cars 108. The consist (also referred to as a trainset) 100, 108 of FIG. 2, that is, the assembly of locomotives and train cars, is multi-articulated, and articulation allows swiveling of adjacent segments of the consist (or trainset) in three-dimensional space. Relative motion in three dimensions allows the trainset to conform to the vee-way as the vee-way twists in curves and bows at the top and bottom of hills. The vehicle 100 may be connected via the coupler 326 to a number of different passenger cars and a second locomotive vehicle may be attached at the end of the passenger cars. The coupler 326 in some embodiments may be a ball and socket coupling, but in other embodiments may be a hook and latch, buffers and chains, link and pin, and the like.

Figure 4A:
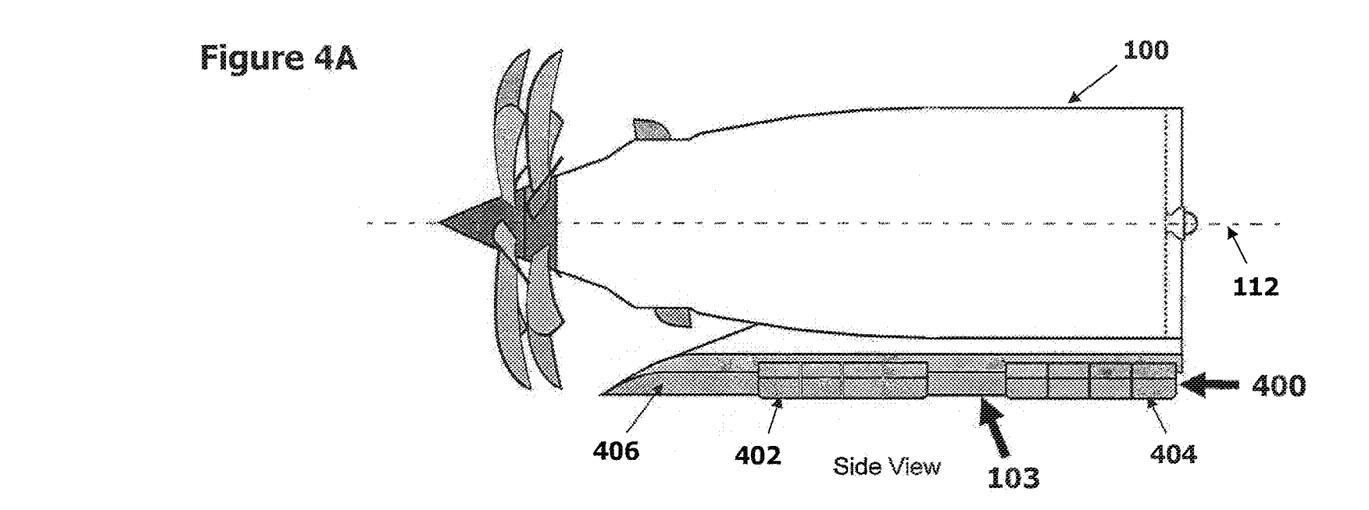
FIG. 4A is a side view of the vehicle.
Figure 4B:
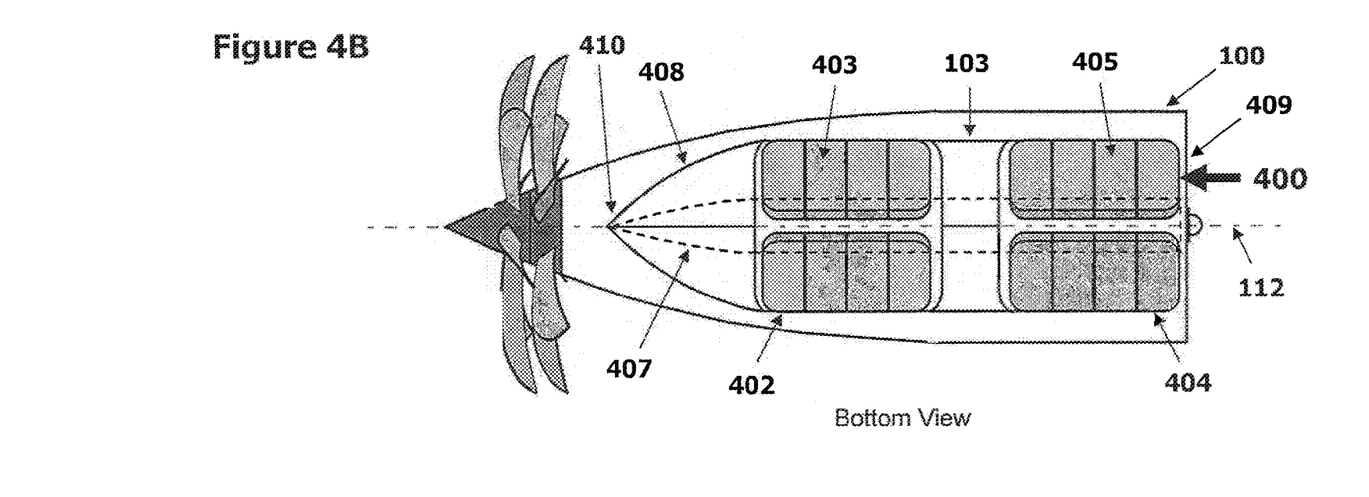
FIG. 4B is a bottom view of the vehicle.

FIGS. 4A and 4B illustrate a side-view and a bottom view, respectively, of the vehicle 100, emphasizing the gas-bearing levitation system 400, which includes the gas bearings 328. The levitation system 400 may include a front set of bearing segments 402, 403 and a back set of segments 404, 405. The segments are positioned longitudinally along the length of the body 102 of the vehicle 100. The segments may twist, tilt, or rotate, possibly under the control of servo mechanisms that sense the shape of the vee-way, so as to allow the gap between a segment and the vee-way to be controlled. The suspension system 400 may also include a fairing 406 that partially covers the segments 402-405 and thereby reduces the aerodynamic drag on the gas bearings 328. The fairing 406 is attached to the bottom of the vehicle 100, and has generally planar sides 408 and a planar back portion 409, but tapers to a beak-like point 410 oriented to the front of the vehicle 100 (the direction of travel). Below the planar sides 408, a surface of the fairing 406 also defines a downwardly angled "V" shape area, which is contoured to match a V-shaped surface on the guideway 202. For example, the guideway 202 may be shaped as a vee-way, and the fairing 406 may then be shaped as a "V", to conform to the shape of the vee-way. Aerostatic bearing segments 403 and 405 are separated on the face of the lower V-shaped portion of the fairing 406, and the opposing segments 402 and 404 are supported on the opposing face of the V-shaped portion of the fairing 406. The levitation system 400 may additionally include a strut 407. The strut 407 supports the body 102 of the vehicle 100 above the levitation system 400. The strut 407 is disposed between the body 102 of the vehicle and the fairing 406.

The segments 402-405 include four segments for each bearing surface, but any number of segments may be used. The segments 402-405 are included both on vehicles acting as locomotives, as well as passenger and cargo cars. Referring now to FIG. 4B, the suspension segments 402-405 may be grouped into sections, a first segment 402, a second segment 403, a third segment 404 and a fourth segment 405, not necessarily numbered in this description as they occur along the length of the vehicle 100. The bearing segments 402-405 may be aerostatic gas bearings or the magnets of the magnetic-levitation embodiment described below. In the aerostatic gas-bearing embodiment, the segments 402-405 have multiple holes or are made of a porous material. For example, the segments 402-405 may be constructed of porous graphite or of metal that may be sintered or contain holes, allowing the flow of fluid between the segment and the upper V-shaped surface of the vee-way. Fluid (gas or liquid) is pressurized and forced out of the holes of the segments 402-405, creating a low-friction fluid film between the bearing segments 402-405 and the top of the vee-way (guideway) 202, effectively levitating the vehicle 100 above the tube 106 on a thin film of gas or liquid. If the suspension system 400 has aerostatic gas bearings, the gas 107 used to suspend the vehicle 100 may be hydrogen. Likewise, if the gas 107 is an alternative gas, for example, methane or helium, this gas will likewise be the operating fluid of the aerostatic gas bearings. The hydrogen or other gas 107 may be provided to the gas-bearing levitation system 400 by the intake 306, and pressurized via a gas pump carried onboard vehicle 100 powered by the fuel cells. In this embodiment, the atmosphere of the tube 106 is not polluted with other non-hydrogen elements, as hydrogen 107 is taken from the tube 106 and then distributed back into the tube 106 as it creates a fluid film to levitate the vehicle 100. In other embodiments, hydrostatic (water) bearings may be used as the fluid in the levitation system 400. In this embodiment, liquid is forced out through the segments 402-405 creating the suspension layer for the vehicle 100. The liquid water is then collected in a trough running down the center of the tube 106. If water is the levitating fluid, the hydrogen or other gas comprising the atmosphere 107 may be saturated with water vapor. In the case of magnetic levitation, the segments 402-405 represent permanent magnets, superconducting magnets, AC electromagnets, or the like.

Figure 5:
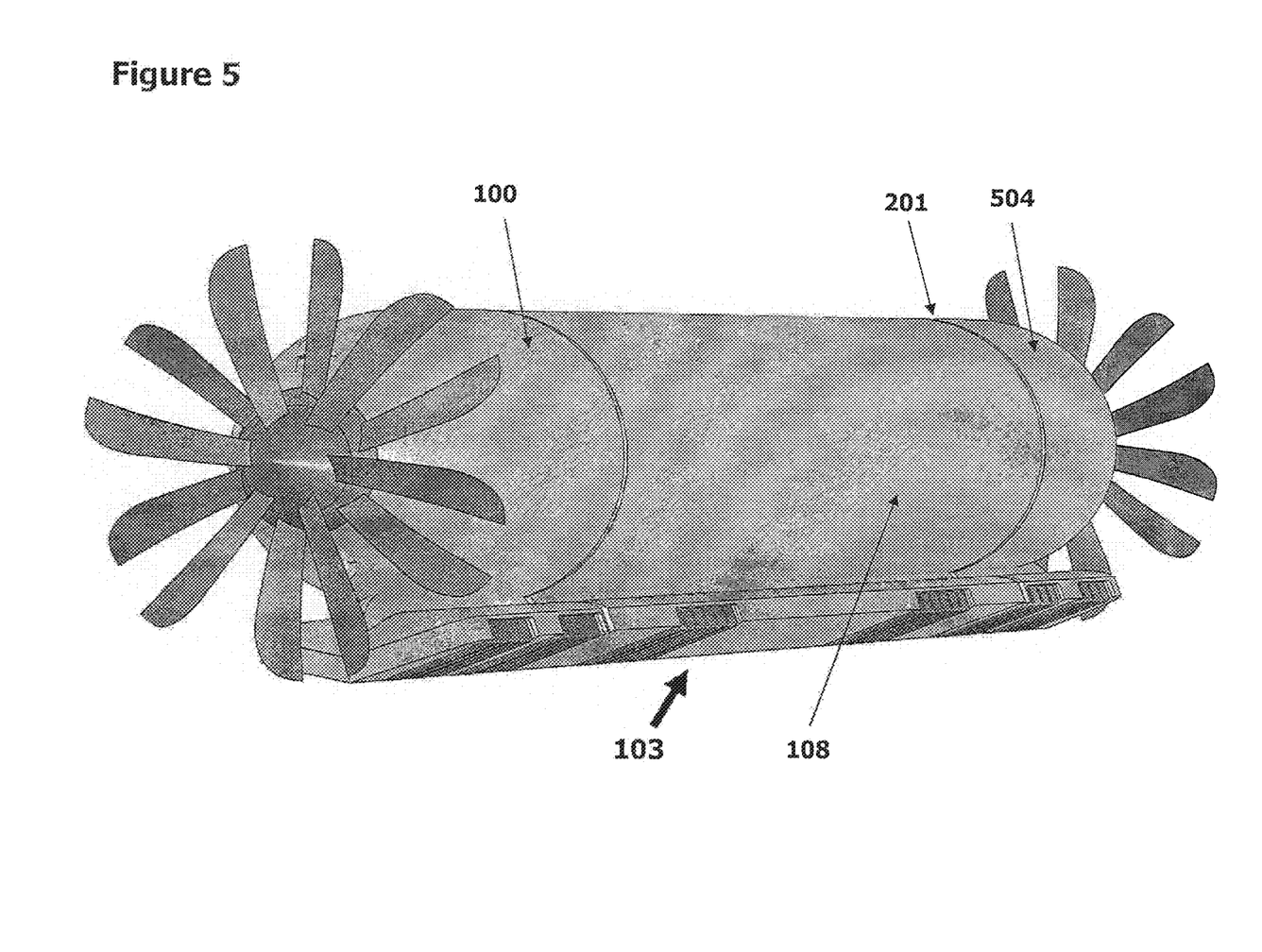
FIG. 5 is a front perspective view of two vehicles connected with a car.

Referring now to FIG. 5, as discussed with regard to FIG. 3, the vehicle may be used as a singular vehicle 100 or as a locomotive for other cars. For instance, a first vehicle 102 is connected to a car 108 and a second vehicle 504. The car 108 has a levitation system 400, but is not primarily designed to drive or propel the other cars 108 or vehicles 102, 504. The car 108 may be configured to transport passengers, cargo, or both. The car 108 is constructed out of a similar material to the body 101 of the vehicle 100. The car 108 may have similar features to a passenger portion of an aircraft. For example, the car 108 may have seats, restrooms, a sink, a kitchen, and the like. The car 108 may connect to other cars as well as to the locomotive vehicle 102 via the coupler 326. Although in FIG. 5, the car 108 is illustrated as connected to two vehicles 102 and 504, only one vehicle 102 may be needed to pull a car 108, and the illustration is merely one embodiment. For instance, the vehicle 102 may pull car 108 by itself or the vehicle 102 may pull multiple cars 108 by itself. Furthermore, in other embodiments, there may be multiple cars 108 between each vehicle 102, 504.

Figure 6:
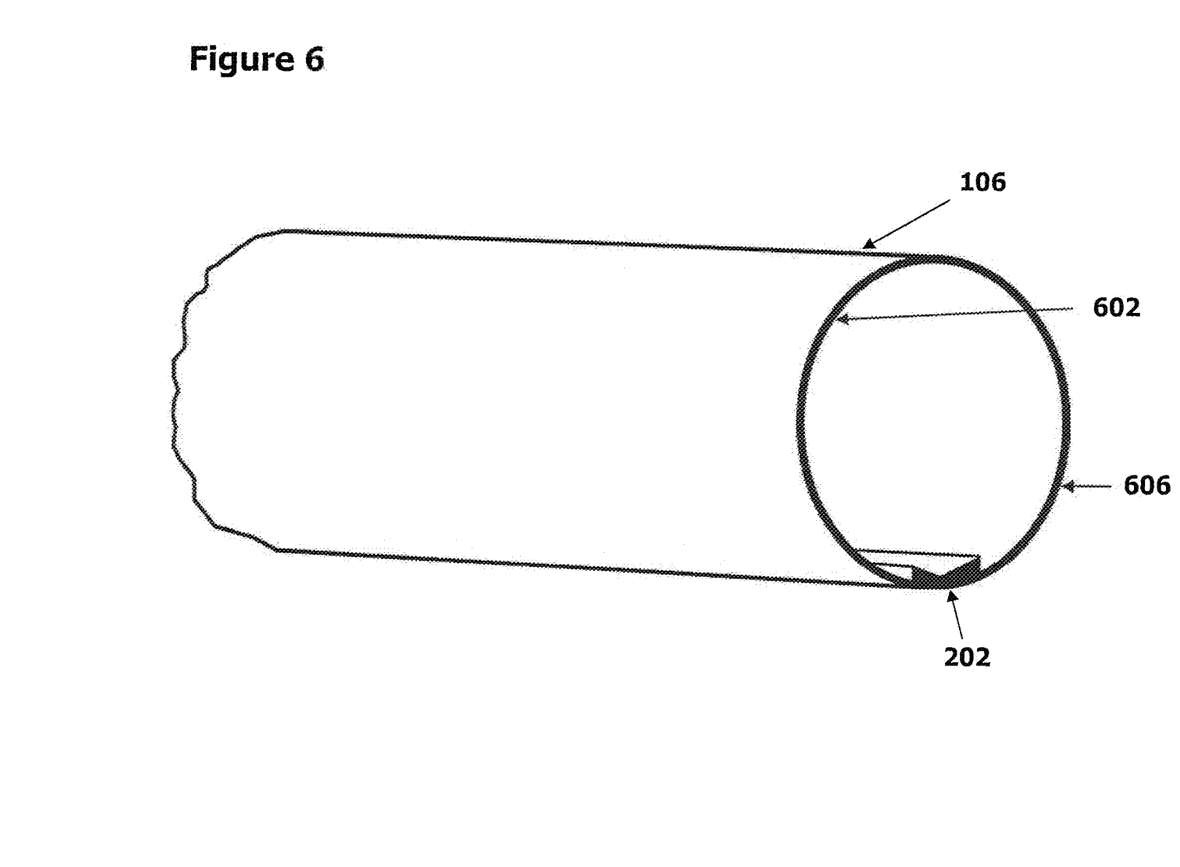
FIG. 6 is an isometric view of a portion of the tube.

FIG. 6 illustrates an isometric view of a portion of the tube 106 and its guideway 202. The tube 106 is generally cylindrical, including an inner diameter 602 and an outer diameter 606, and a V-shaped guideway 202 along a bottom portion of the tube. The guideway, as shown also in FIG. 2, is not necessarily integral to the tube but may be the equivalent to a V-shaped (or otherwise-shaped) rail running along the bottom of tube 106. The inner diameter 602 may be any suitable dimension to provide a conduit for various possible vehicle 100 diameters. In one particular embodiment, the inner diameter 602 may be approximately 5 meters. This diameter (5 meters) is able to accommodate an embodiment of the vehicle 100 having a 2.69 meter fuselage diameter and a propeller diameter of approximately 4 meters. This inner diameter 602 allows the vehicle 100 to fit inside the tube 106 while maintaining a gap between the wall of the inner diameter 602 and the vehicle 100 and its propellers 300, 302. This configuration allows the vehicle 100 to levitate above the bottom 604 the tube 106 and for hydrogen to pass between the consist or trainset and the inner surface of tube 106 when the vehicle 100 is at speed. The outer diameter 606 forms the outside of the tube 106 and may be any size. Additionally, as the tube 106 may be located either above ground, underground, or under water, the outer diameter 606 may be in contact with the surrounding elements, whether those elements be air, dirt, rocks, or water. Therefore, in some embodiments, the outer diameter 606 may include additional layers of insulation or protective materials to prevent wear and tear of the tube 106 due to outside elements. These additional layers may be concrete, plastic, composite materials, ceramics, metals, or any combination of similar materials.

The guideway 202 may be used to support a track or other guidance system for the vehicle 100. In some embodiments, the guideway 202 may be located at the bottom of the tube 106, in other embodiments the guideway 202 may be located on the sides or top of the tube 106. In some embodiments, the guideway 202 may used to support a rail system and may provide tracks to support and guide the vehicle 100. The guideway 202 may be shaped in any manner, however in some embodiments the guideway 202 may be shaped as the letter "V" or as the letter "U." If the vehicle includes a magnetic levitation system, the guideway 202 may include tracks that have wires, solenoids, conducting materials, magnets, or may otherwise produce a magnetic field in order to produce levitation (or propulsion) of the vehicle 100.

Figure 7:
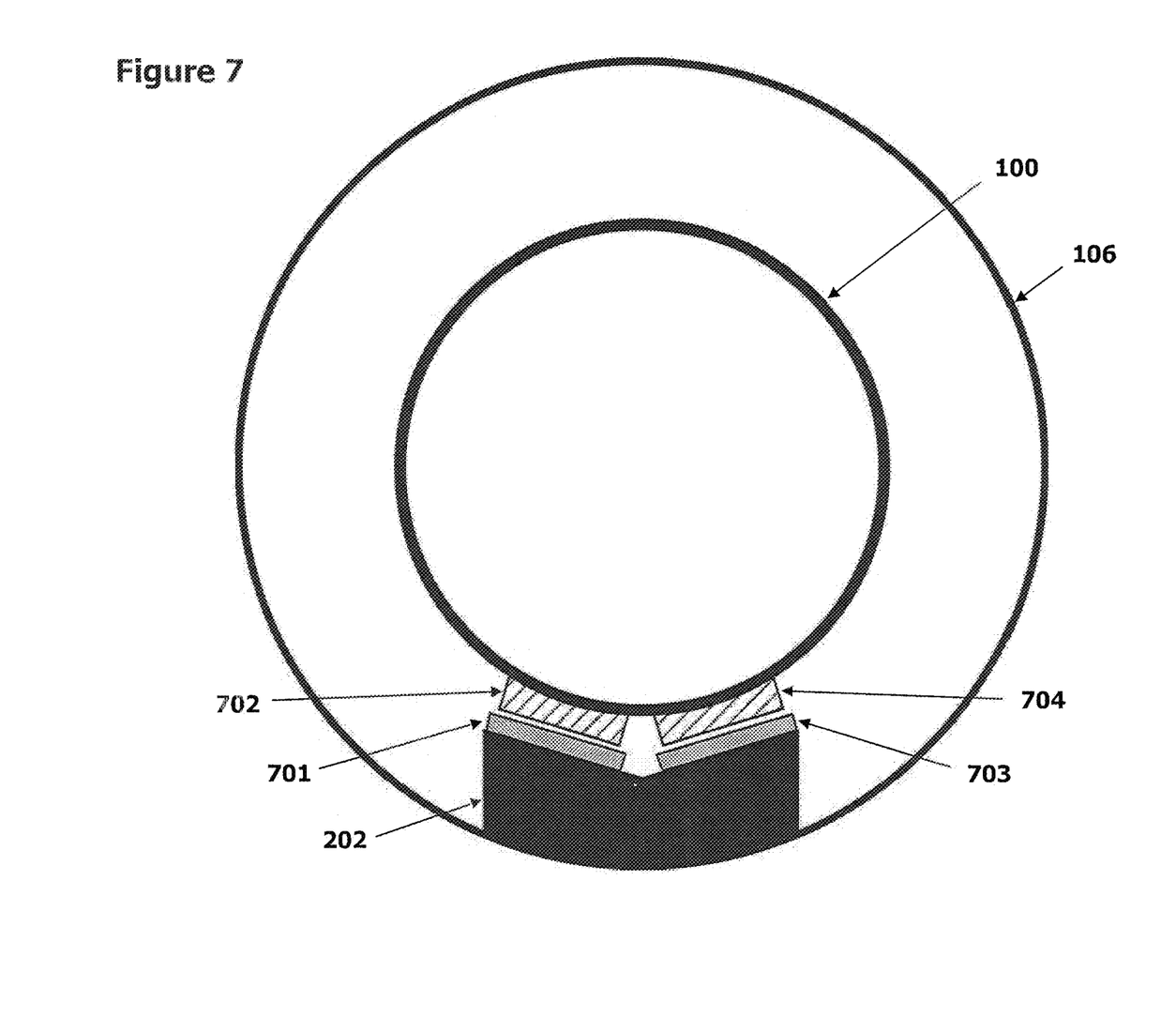
FIG. 7 is a schematic showing a magnetic-levitation apparatus for the supersonic hydrogen tube vehicle.

FIG. 7 shows a schematic of magnetic levitation of the vehicle within the tube 106. Conforming to the shape of the vee-way, which may be in other shapes than a "V," as discussed above, are continuous metal sheets 701, 703, shown in cross-section in FIG. 7, running the length of tube 106. The metal should be of high electrical conductivity, and aluminum is an appropriate (but not limiting) material. Magnets 702, 704 replace the segments 402, 403 of the gas bearings 328. Several kinds of magnets may be used, for example, permanent magnets, superconducting magnets, AC electromagnets, or DC electromagnets. Embodiments of these are described as follows. When magnets 702, 704 are permanent or superconducting magnets, the relative velocity of the vehicle over the conducting sheets 701, 703 induce electrical currents and hence magnetic fields in the sheets. The induced magnetic fields in sheets 701, 703 are of the same-polarity (or "like-polarity") to the magnets on the vehicle (e.g., N on the bottom of levitation system 103 and also N on the top of sheet 701, 703), and the resulting N-N or S-S repulsion levitates the vehicle. The faster the relative velocity of vehicle 100 and sheets 701, 703, the stronger the induced field and the greater the potential height of the levitation gap between magnets 702, 704 and metal sheets 701, 703. When the vehicle is stopped there can be no induction and the levitation gap is zero. Hence, embodiments employing permanent or superconducting magnets employ "landing wheels" or some other mechanism to support the vehicle as it approaches and attains zero speed.

The embodiment employing AC electromagnets is analogous to the aerostatic gas-bearing embodiment. Alternating current in the solenoids of the AC electromagnets induces alternating same-polarity magnetic fields in metal sheets 701, 703. The same-polarity (N-N or S-S) of the electromagnet fields and induced fields produces levitation of vehicle 100. Like aerostatic gas bearings above, the AC magnetic levitation allows the vehicle to hover because the magnetic fields induced in conductive sheets 701, 703 are due to the alternating current in the solenoids of electromagnets 702, 704 rather than relative motion of the vehicle. The AC-electromagnets 702, 704 may use feedback control of AC-solenoid current to control the gap height between magnets 702, 704 and the conductive sheets 701, 703.

There is a type of DC magnetic levitation that can also provide hovering. In such an embodiment, the vehicle could be suspended below a ferromagnetic rail and an appropriate gap between the rail and DC magnets on vehicle 100 would be provided through feedback control of the solenoid DC current. While this embodiment could require a very different design of the guideway—namely, a ferromagnetic rail rather than aluminum sheets on a vee-way—this is also a viable embodiment for magnetic levitation of vehicle 100.

The vee-way, with attached, conforming metal sheets or alternatively a ferromagnetic rail, then guides the vehicle 100 through the tube 106. The magnetic levitation apparatus conforms generally to the shape of the vee-way or ferromagnetic rail so that the vee-way or rail can guide vehicle 100 through tube 106.

Although one or more of the embodiments disclosed herein may be described in detail with reference to a particular supersonic vehicle, the embodiments should not be interpreted or otherwise used as limiting the scope of the disclosure, including the claims. In addition, one skilled in the art will understand that the following description has broad application. For example, while embodiments disclosed herein may focus on certain vehicles, such as a propeller driven vehicle, it should be appreciated that the concepts disclosed herein equally apply to other transportation methods. For example, the concepts disclosed herein may be employed in automobiles, trains, and aircraft. In addition, it should be appreciated that the concepts disclosed herein may equally apply to non-transportation related items, such as manufacturing and scientific laboratory apparatus. Furthermore, while embodiments disclosed herein may focus on a gas-filled operating atmosphere, the concepts disclosed herein equally apply to other operating atmospheres, such as air. Accordingly, the discussion of any embodiment is meant only to be exemplary and is not intended to suggest that the scope of the disclosure, including the claims, is limited to these embodiments.

The invention claimed is:

1. A transportation system comprising:
a substantially enclosed conduit provided between a first geographic location and a second geographic location, the enclosed conduit being provided with a hydrogen or methane atmosphere; and
a vehicle dimensioned to fit within the conduit, the vehicle comprising a propulsion system coupled with a motor receiving power from at least one fuel-cell stack, the at least one fuel-cell stack configured to receive the hydrogen or methane from the atmosphere of the enclosed conduit through an intake located on the vehicle and to use the received hydrogen or methane as a fuel source for the at least one fuel-cell stack, the vehicle further utilizing a levitation system configured to support and guide the vehicle within the enclosed conduit.

2. The transportation system of claim 1 wherein:
the substantially enclosed conduit comprises a tube;
the vehicle comprising:
a substantially cylindrical body having an inside portion and an outside portion;
the propulsion system including:
a propeller assembly supported at an end of the outside portion of the cylindrical body, the propeller providing propulsion to move the vehicle within the tube; and
the levitation system comprising:
a guideway supporting and guiding the vehicle on a plurality of aerostatic gas bearings, magnetic levitation, or rollers.

3. The transportation system of claim 2, wherein the aerostatic gas bearings comprise porous materials through which passes a gas.

4. The transportation system of claim 2 wherein a guideway in the bottom portion of the tube defines opposing planar surfaces intersecting to define a V-shape, the aerostatic gas bearings further comprising a first set of aerostatic gas bearings and a second set of aerostatic gas bearings defining a second V-shape in substantial conformance with the V-shape of the guideway within the tube, the aerostatic gas bearings configured to levitate the vehicle above the bottom portion of the tube during operation of the vehicle.

5. The transportation system of claim 2 wherein:
the guideway within the tube includes magnetic material; and
the levitation system comprises magnets, wherein the magnets interact with a magnetic rail and levitate the vehicle above the magnetic rail.

6. The transportation system of claim 2 wherein the propeller is a contra-rotating propfan.

7. The transportation system of claim 2 wherein the propulsion system further includes a propeller assembly supported at an opposing end of the outside portion of the cylindrical body.

8. The transportation system of claim 1 wherein the at least one fuel-cell stack is a proton-exchange membrane fuel cell.

9. The transportation system of claim 1 wherein the atmosphere in the tube is provided at a pressure above ambient atmospheric pressure.

10. The transportation system of claim 1 wherein the atmosphere within the tube is maintained at or above 75% by volume total hydrogen gas or at or above 17% by volume total methane gas.

11. The transportation system of claim 1 wherein the vehicle includes a releasable coupler configured to couple the vehicle with a second vehicle, the second vehicle including a passenger compartment including a plurality of seats for passengers.

12. The transportation system of claim 1 wherein:
the substantially enclosed conduit comprises a tube;
the vehicle comprising:
a substantially cylindrical body having an inside portion and an outside portion;
the propulsion system including:
a propeller assembly supported at an end of the outside portion of the cylindrical body, the propeller providing propulsion to move the vehicle within the tube; and
the levitation system comprising a plurality of magnetic bearings.

* * * * *